United States Patent [19]
Robichaud

[11] Patent Number: 5,369,944
[45] Date of Patent: Dec. 6, 1994

[54] BLUEBERRY HARVESTER AND METHOD OF HARVESTING BLUEBERRIES

[76] Inventor: Ora Robichaud, R.R. #1 Box 17, Site 21, Sheila N. B., Canada, E0C 1Z0

[21] Appl. No.: 165,634

[22] Filed: Dec. 13, 1993

[51] Int. Cl.⁵ .......................................... A01D 46/00
[52] U.S. Cl. ...................................... 56/330; 56/130; 56/DIG. 2
[58] Field of Search ............. 56/130, 330, 328.1, 56/229, DIG. 2

[56] References Cited

U.S. PATENT DOCUMENTS

| | | | |
|---|---|---|---|
| 2,524,631 | 10/1950 | Minutillo | 56/330 |
| 3,675,406 | 7/1972 | Grant et al. | 56/330 |
| 4,141,204 | 2/1979 | Kuryluk | 56/330 |
| 4,790,127 | 12/1988 | Nason et al. | 56/330 |
| 5,113,644 | 5/1992 | Windemuller et al. | 56/330 |

FOREIGN PATENT DOCUMENTS

| | | |
|---|---|---|
| 1318135 | 5/1883 | Canada . |
| 523354 | 4/1956 | Canada . |
| 948858 | 6/1974 | Canada . |
| 961275 | 1/1975 | Canada . |
| 1249130 | 1/1989 | Canada . |
| 1249727 | 2/1989 | Canada . |

Primary Examiner—David J. Bagnell

[57] ABSTRACT

An apparatus for harvesting berries on low plants, such as wild blueberries, is adapted for mounting on the 3-point hitch of a farm tractor. The apparatus has a drum which rotates in a direction such that the lower segments thereof move in a direction against a direction of travel. A plurality of combs having a plurality of fingers generally pointing in a direction of rotation, are mounted at regular angular intervals on this drum. As the apparatus moves over a crop, plants are raked in an ascending movement, retaining thereby the fruits to be harvested. The berries are carried by respective combs atop the drum where emptying of each comb is done by gravity. The rotation of the drum and the corresponding advance of the combs being slower than the free rolling of the berries on the backward face of the drum, the fruits gain speed rapidly to rebound on the back surface of a preceding comb, to thereby jump from the surface of the drum and leap over a gap, reaching into an accept chute. As round fruits have negligible coefficient of friction as compared to leaves and debris, the rolling of berries has the additional effect of separating the fruits from leaves and twigs. Such debris remain on the surface of the drum until able to fail straight down, avoiding thereby the accept chute.

20 Claims, 7 Drawing Sheets

BLUEBERRY HARVESTER AND METHOD OF HARVESTING BLUEBERRIES

BACKGROUND OF THE INVENTION

This invention relates to apparatus for harvesting berries on low plants, and in particulars, is directed to apparatus for harvesting wild blueberries in commercial quantities.

The market, demand for wild blueberries is such that over the last several years, blueberry fields have increased in number and in size wherever the climate and soil conditions are appropriate for growth thereof.

Harvesting of wild blueberries is usually done from mid-July to early August, depending upon the location of the field and the weather conditions at that time. Hence, it is a common practice for a blueberry grower to harvest fields ranging from 25 acres to 250 acres within a 2-3 weeks period.

The task is too tedious to be done manually, or to be done by workers using manual rakes and implements, Therefore, there is a significant demand for self-propelled mechanical harvesters.

A number of self-propelled apparatus for harvesting blueberries is available commercially. One type of machine is described in Canadian patent no. 523,354 to L. C. Getsinger, April 1956. The machine has a drum, and a number of combs spaced at regular angular intervals, and across the surface of this drum. The drum rotates against the direction of the travel of the machine such that the fingers of the combs intersect with berry plants and rake the fruits thereon.

The combs are arranged to follow a cam groove so that the fingers withdraw within the surface of the drum at pre-determined location on the circumference of their course to facilitate the release of fruits onto a slide and into an exit conveyor.

Other similar self-propelled machines using articulated fingers, with an exit conveyor placed at the centre of the drum, are described in:

Canadian Patent: 948,858 to G. L. Gray, June 1974
Canadian Patent: 961,275 to C. G. Burton, Jan. 1975
and U.S. Pat. No. 3,675,406 to Grant et al, July 1972.

The articulation of fingers, the need for an exit conveyor, and the coordination of the various components require complex mechanics. The price of these machines is therefore relatively high, as well is the cost of maintenance thereof.

Another type of machine available commercially mounts on a farm tractor. The machine is described in Canadian patents no, 1,249,727 and 1,318,135, both to D. R. Bragg, and are dated in February 1989 and May 1993 respectively. The machine is also mechanically intricate, having similar articulated fingers and an exit conveyor as already described.

The mounting of the machine on a farm tractor requires intensive modifications to the tractor and the fitting of special fixtures. This installation is better done by specialized shop or by the harvester's manufacturer himself.

The high purchase value of this machine together with the substantial installation costs and the nature of the involvement for one needing his tractor for other work during the harvest period are amongst the factors disfavouring an acquisition of the machine by the small and medium size growers.

The invention cited above is probably the fastest machine available at this time, with a disclosed speed of 2 miles per hour. Conversely, excessive speed is known to clog the fingers of the combs with leaves, twigs and squashed berries. Thus, a cylindrical brush is installed adjacent to the drum, to clean the fingers before each sweep, thereby adding complexity to the machine. Nevertheless, the gatherings of this machine are known to contain much leaves and debris.

SUMMARY OF THE INVENTION

In accordance with one aspect of the present invention, the blueberry harvester comprises a drum and a plurality of combs rigidly mounted thereon across the surface thereof and at regular angular intervals around the circumference therefrom. The drum is pivotally held within a frame which is adapted to mount on the 3 point hitch of a farm tractor. The drum is driven by an hydraulic motor powered from the tractor's hydraulic pressure supply.

The new blueberry harvester is operated with the tractor moving in the reverse direction and the drum is turning so that the lower segments thereof rotate in a direction against the direction of travel.

As the machine moves, blueberry plants are being raked by combs having fingers of improved shape, so that a relatively small amount of leaves are being pulled off the plants, and so that a relatively small number of fruits are damaged.

The berries are carried by respective combs atop the drum where emptying of each comb is done by gravity, The rotation of the drum and the corresponding advance of the combs being slower than the free rolling of the berries on the backward face of the drum, the fruits gain speed rapidly to rebound on the back surface of the preceding comb, to thereby jump from the surface of the drum and leap over a gap, reaching into an accept chute.

As round fruits have negligible coefficient of friction as compared to leaves and debris, the rolling of berries has the additional effect of separating the fruits from leaves and twigs. Such debris remain on the surface of the drum until able to fall straight down, avoiding thereby the accept chute.

A preferred embodiment of the invention is operated at a speed ranging from 42 to 76 feet/minute. Although the machine is efficient when installed on most types of farm tractors, the best results are achieved with a tractor having a creeper speed optional transmission for cultivating vegetable and specialty crops, or with a tractor having an hydrostatic transmission. At those speeds, it has been found that the machine, when harvesting wild blueberries, has a picking rate equivalent to the sum of from six to eight hand pickers using manual rakes.

A seat is provided for an operator. The operator regulates the speed and height of the drum to accommodate for the irregularities of the terrain, and for the density of blueberry bushes, and he handles receptacles at the accept chute. A table atop the frame of the machine is large enough to contain several full berry receptacles preventing thereby unnecessary interruption of a harvesting pass across a blueberry field.

The new machine is mechanically simple and has very few moving parts as compared to prior art equipment. The principle of rolling berries by gravity eliminates the need for articulating and brushing combing fingers, for fabricating slotted drum surfaces, for mounting a conveyor within this drum, and for fanning the produce to remove debris, as prior art equipment does. The machine is thereby relatively inexpensive and affordable to most commercial growers. More importantly, berries harvested with this new apparatus are generally clean and in good condition.

BRIEF DESCRIPTION OF THE DRAWINGS

Other advantages of the invention will be apparent from the following description of a preferred embodiment illustrated in the accompanying drawings, in which.

DETAILED DESCRIPTION OF THE INVENTION

Figure 1:
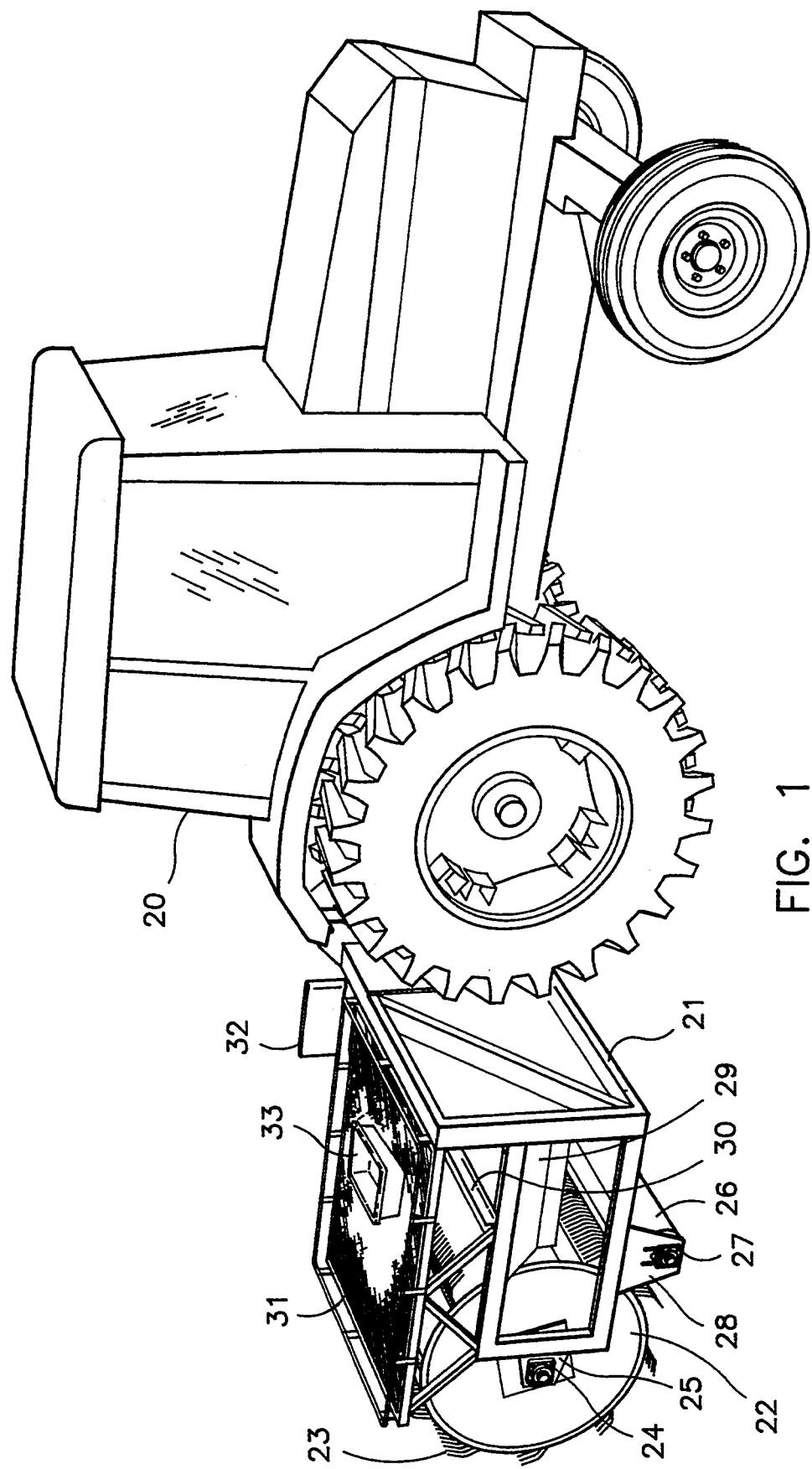
FIG. 1 is a perspective view of the left side of a preferred embodiment of the harvester mounted on a farm tractor. The left side is determined when facing a direction of travel.

Referring to FIG. 1, the blueberry harvester is mounted behind a farm tractor 20 and is operated with the tractor moving in a reverse direction.

The harvester comprises a frame 21, and a harvesting drum 22 mounted within frame 21 by means of a bracket plate 25 and a flange block bearing 24, at each side of the drum.

The drum 22 has a fully enclosed cylindrical portion contained within two circular flanges centered on a shaft. The drum 22 has a plurality of combs 23 mounted on, and parallel to the longitudinal axis of the cylindrical portion, at regular angular intervals around the circumference thereof.

The comb consists of a mounting member supporting a plurality of fingers as it will be better described on subsequent figures. The fingers are curved so that their free ends point generally in the direction of rotation of the drum 22. The distance of the free end in relation to the cylindrical surface of the drum 22 determines the reach of each comb, or the envelope thereof.

The frame 21 is equipped with a bumper roll 26 to maintain the combs at a safe distance from the ground and thereby to prevent possible damages associated with a comb sweeping through sod and root systems. The bumper roll 26 is free to roll within a flange block bearing 27, at each side of the roll, and is adjustable in height through two slotted brackets 28, each supporting a bearing 27.

Figure 2:
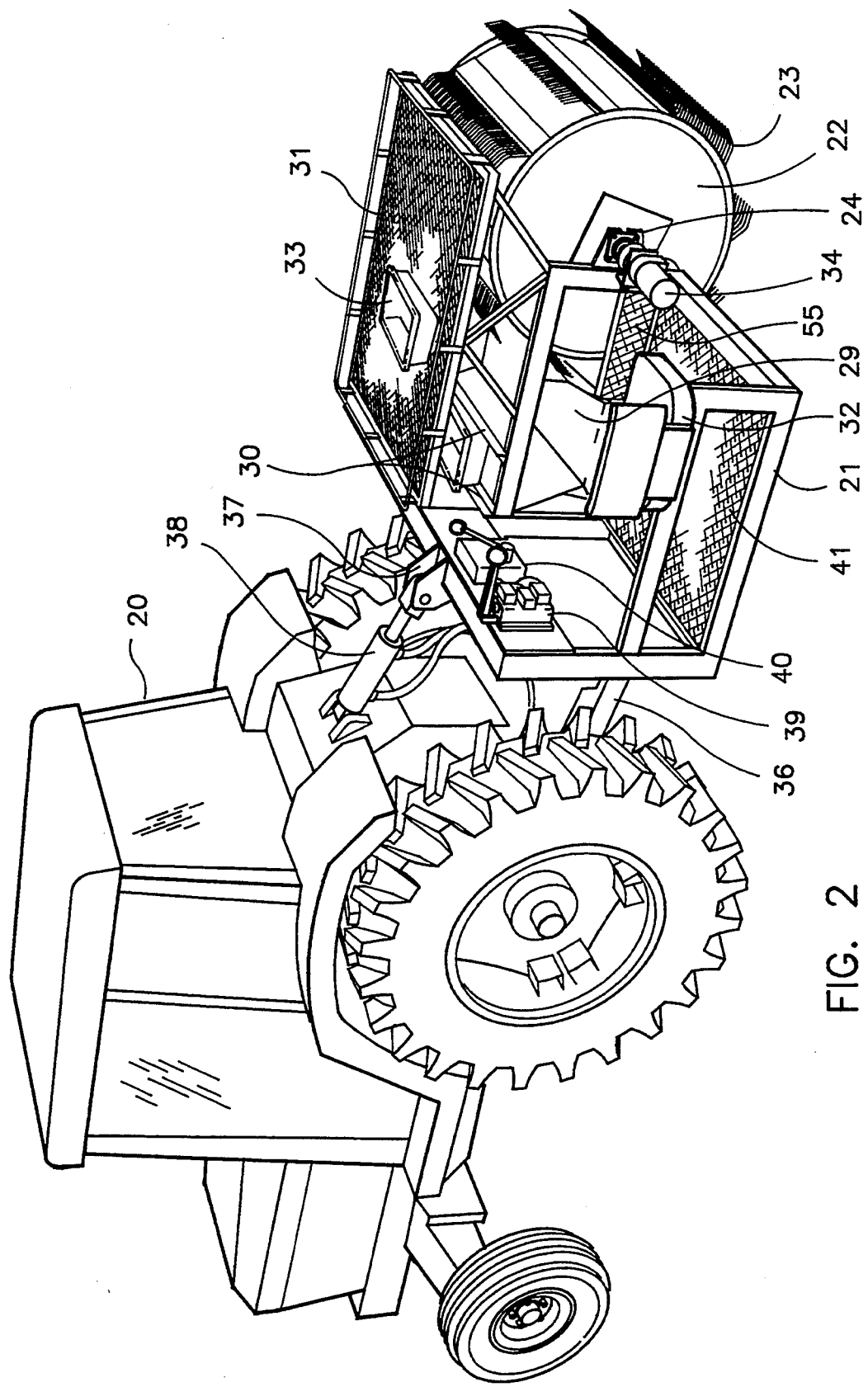
FIG. 2 is a perspective view of the right side thereof.

The harvesting drum 22 discharges fruits into an accept chute 29 which is better seen on FIG. 2. Also better seen of FIG. 2 is a storage rack 30 to contain a number of empty receptacles for berries, This storage rack 30 is conveniently located between frame members, offering no encumbrance to the operator, Full receptacles 33 are placed atop the apparatus onto a platform 31 provided therefor. The platform 31 is sufficiently large to hold several receptacles 31 side by side and in the stacked position so that the harvester does not have to stop amid a harvesting pass through a blueberry field.

Figure 3:
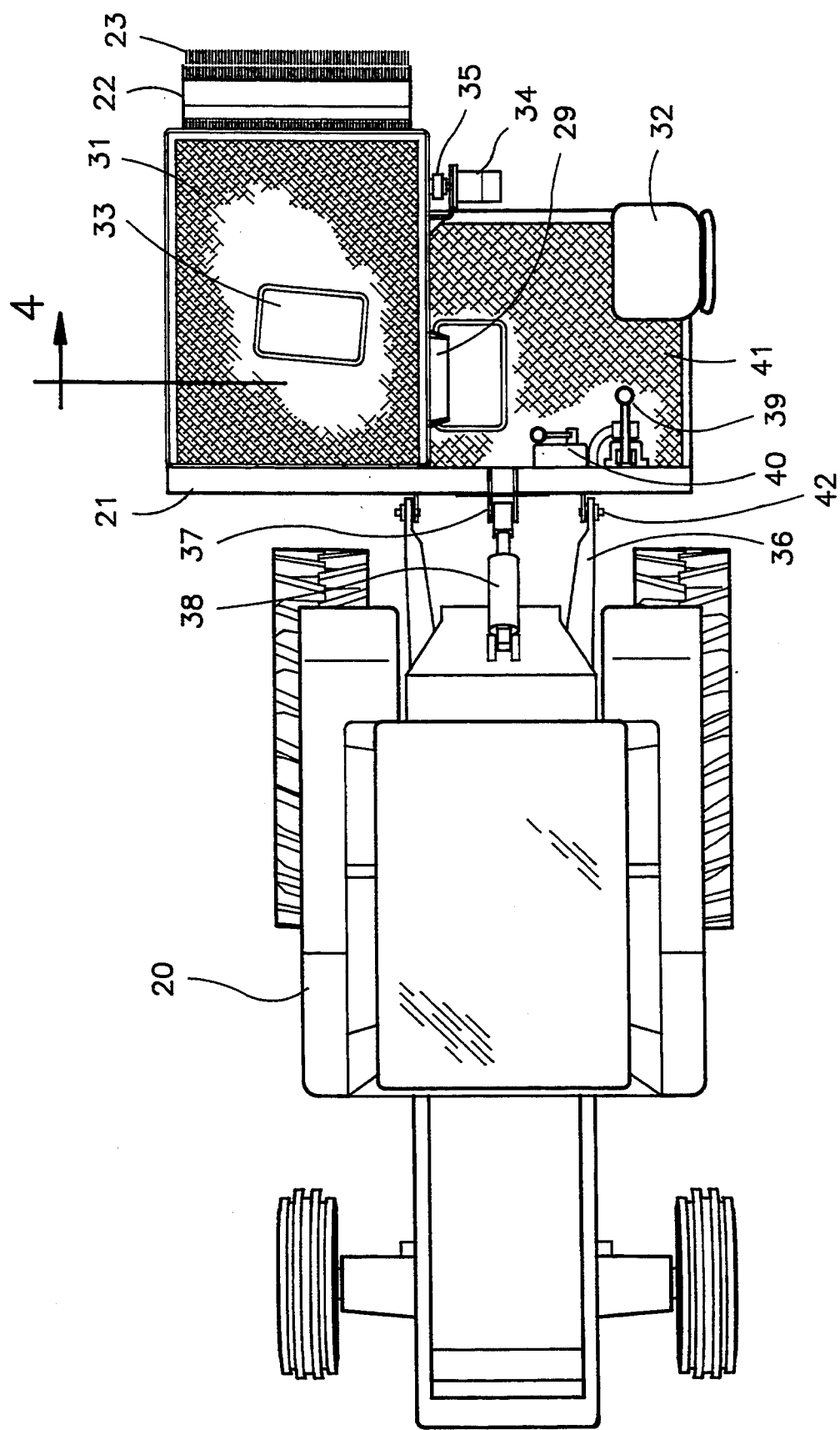
FIG. 3 is a top plan view of the same harvester and of a farm tractor.

As it can be better seen on FIG. 2 and FIG. 3, the frame 21 of the apparatus is equipped with an upper hitch bracket 37 and a pair of lower hitch brackets 42. Each lower hitch bracket 42 connects to a respective lower hitch arm 36 on the tractor, The conventional upper hitch arm of a farm tractor is replaced by an hydraulic cylinder 38 which attaches to the upper bracket 37. The height of the harvesting drum 22 can be varied either by the tractor operator using the powered hitch arms 36 or by the harvester operator using an hydraulic valve 39 controlling the cylinder 38.

The harvester is normally operated with the tractor's hitch in the up-floating mode such that bumper roll 26 supersedes action on the tractor's hitch, and on cylinder 38, during sudden calls for up movements to clear encumbrances in the field.

The harvesting drum 22 is actuated by an hydraulic motor 34 connected thereto by a coupling 35. The rotational speed of the drum can also be varied by the operator by means of a flow control valve 40 mounted on the frame 21.

Blueberry plants are combed from a down-up direction by a plurality of combs 23 mounted on the cylindrical surface of the rotating harvesting drum 22. One sweep is generally sufficient to collect all fruits within the envelope of each comb. Therefore, the displacement of the apparatus in relation to the rotation speed of the drum 22 is proportional to the reach of each comb 23, and to the number of combs 23 on the drum 22.

Blueberries are carried within combs 23 over the top of the drum 22 where gravity forces the berries to roll on the backward face of the drum 22. The fruits quickly gain speed to bounce over the back side of a preceding comb 23 and to jump away from the surface of the drum into an accept chute 29. The berries further roll down into an appropriate receptacle 33.

The operator of the blueberry harvester handles receptacles 33 to and from the accept chute 29. The operator normally stands on a platform 41, or he sits on a seat 32, where he has an unobstructed view of the harvesting portion of the drum 22, and where he is within reach of the control valves 39 and 40. As it can be seen of FIG. 2, the operator's platform 41 is bent upward near the mounting of the drum 22 in order to provide a foot plate 55 to prevent accidentally slipping in a comb's path.

Figure 4:
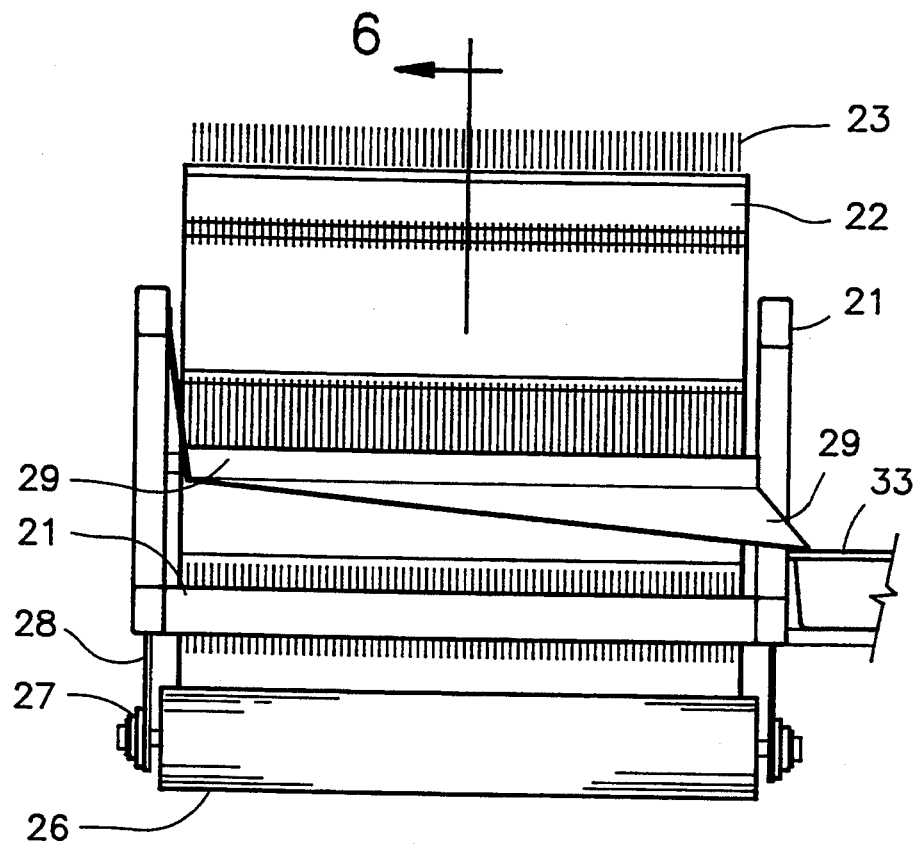
FIG. 4 illustrates a cross-section view of the new harvester along line 4 of the FIG. 3.

The FIG. 4 gives a better illustration of the arrangement of the accept chute 29 and the discharge end of the chute over a receptacle 33. The bumper roll 26 covers the full width of the drum 22 as it can also be seen on this FIG. 4.

Figure 5:
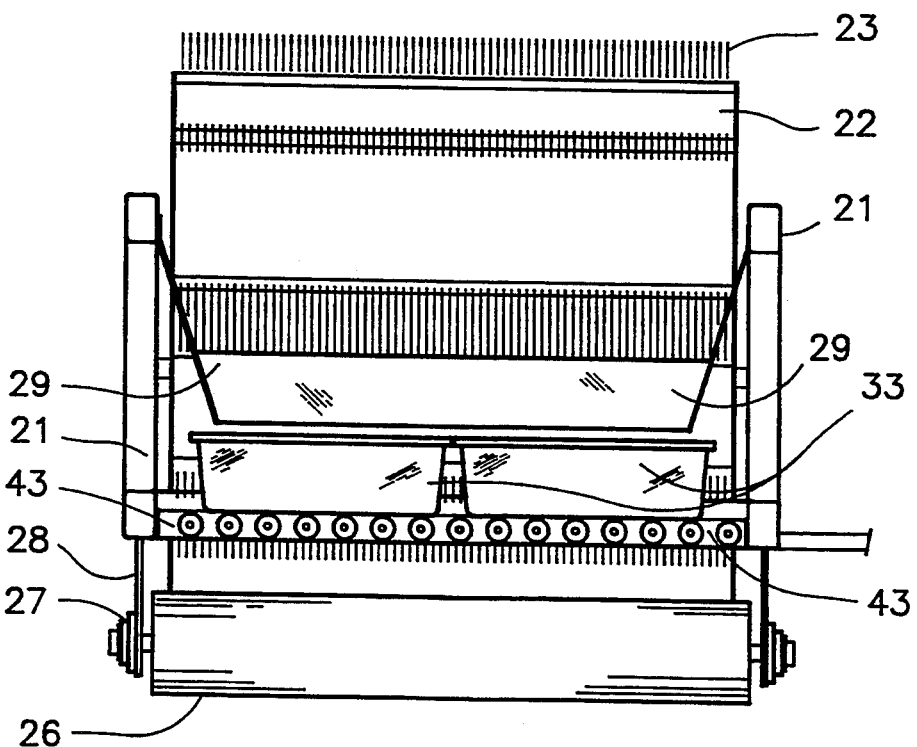
FIG. 5 illustrates the same cross-section view as FIG. 4 wherein receptacles are placed below a straight chute.

Another preferred embodiment for the accept chute 29 is one where the berries fall directly into receptacles 33, as it is illustrated on FIG. 5. The receptacles 33 to be filled are placed on a sliding member such as a live roller conveyor 43, so that the operator can replace full receptacles in a relatively short time. The sliding member could also be replaced by an endless cleated belt conveyor carrying the berries to a more convenient discharge location without departing from the spirit of this invention. Similarly, the bumper roll 26 can be equipped with height sensing devices to automatically control the ideal clearance height for the harvesting drum 22. However, the description and illustration given herein are for the purpose of keeping the apparatus as simple as possible so that the harvester remains financially accessible to most commercial growers.

Figure 6:
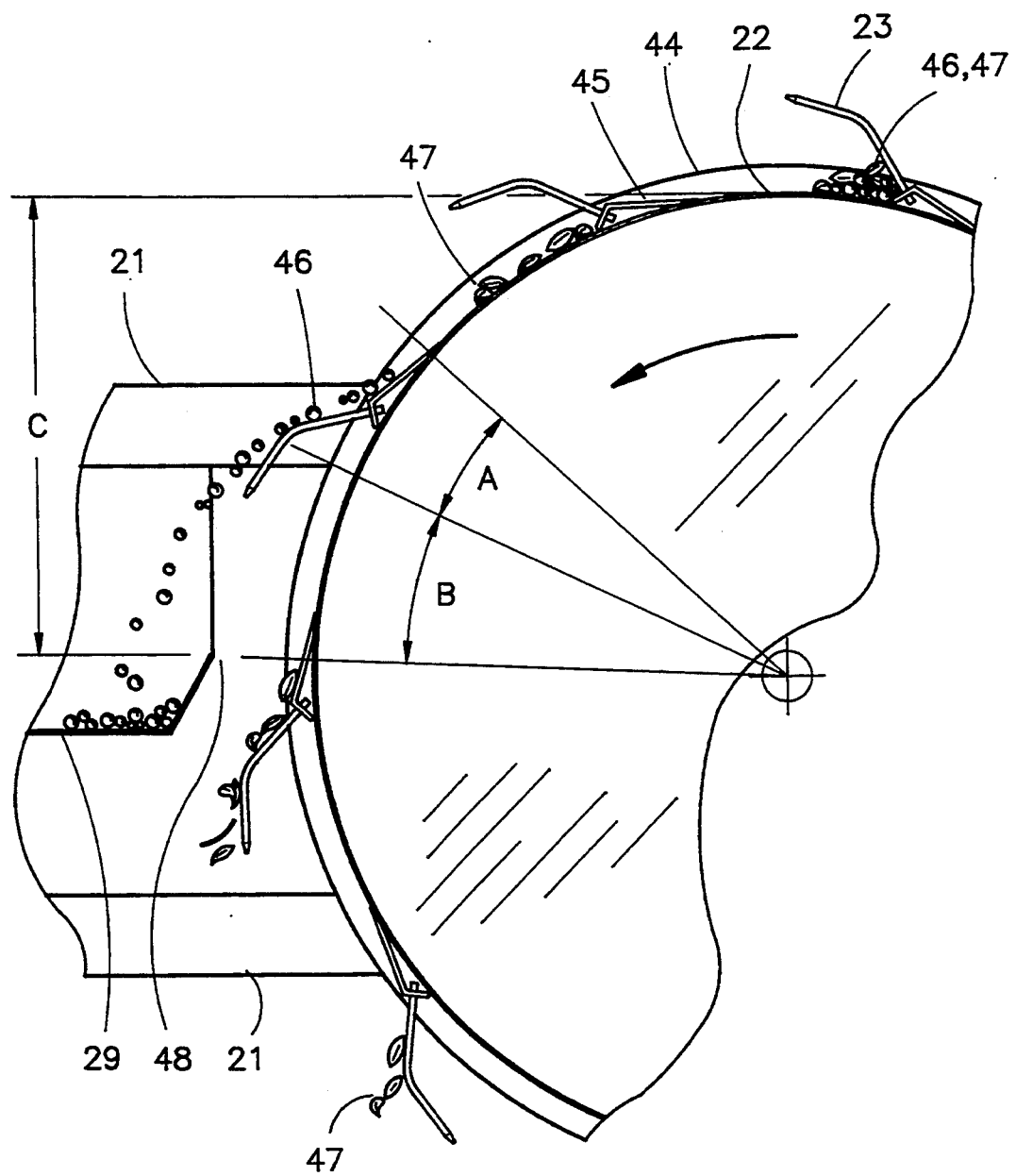
FIG. 6 is a cross-section of the harvesting drum along line B of FIG. 4. The figure illustrates the principle of emptying combs and separating debris by rolling the fruits over a preceding comb and into an accept chute.

From the illustration given in FIG. 6, one can better see the method for carrying the berries up and over the leading face of the drum 22, and for emptying the combs 23, on the backward face of the drum 22.

The cylindrical portion of the drum 22 is encased by a rim 44 at each edge of this cylindrical portion to prevent berries from falling along an end of the combs 23, while being carried upward.

The combs 23 are mounted on the drum surface by means of an angular mounting member 45 having a longer surface pointing against a normal rotation of the drum 22, and being retained to the drum surface by means of fasteners or by means of tack weldments.

Berries 46 and leaves 47 or debris are being carried atop the harvesting drum 22 during the ascending sweep of the combs. As the berries 46 reach the downward side of the drum surface 22, they start rolling, catching up on the preceding comb, bouncing on the sloped mounting member 45 and on the back part of the preceding comb 23, and jumping away from the drum 22, thereby leaping over a gap between the surface of the drum and the edge 48 of the accept chute 29.

The coefficient of friction of rolling berries is near nil. Therefore the speed attained by those berries is almost the speed of free falling objects. Basic kinematic teaches that the time for free falling objects, whether rolling on an incline or being dropped straight down, to reach a certain distance is equal to the square root of (twice this distance divided by the acceleration due to gravity, or 32.2 ft/sec$^2$). Typically, in an exemplary embodiment such as a harvesting drum 22 having a diameter of 36", the total drop of the berries 46 to reach over an edge 48 of the accept chute 29, as shown as value "C" on the FIG. 6, is equal to 16". According to the above formula, the time required by the berries 46 to reach the accept chute 29 is 0.29 seconds, The harvesting drum 22 continues to rotate during the fall of berries 46. Therefore ideal jumping condition for emptying a comb is limited concurrently to a pre-travel displacement "A" and effective discharge displacement "B" of the preceding and adjacent comb. The ideal values for "A" and "B" observed on this exemplary embodiment of the apparatus, are as follows:

For a drum diameter of 36" having 10 combs spaced at 36° from one another, and a drop distance "C"=16" then, Pre-travel distance "A"=6°-14°
Effective discharge distance B=24°-25°
For a total comb travel=30°-40°

Thus, a total travel of a comb of 30°-40° within 0.29 seconds, for a 10-combs drum is equivalent to a rotational speed of 17 to 23 RPM.

Leaves, twigs, straws and debris of the like 47 however have a large coefficient of friction as compared to berries 46. Leaves and other debris 47 have a tendency to gradually slide on the surface of the drum 22, depending greatly upon the local inclination, or local curvature of the drum surface. Leaves and twigs 47 are following the path of berries 46, but remain held on the drum surface, and later on the back surface of the preceding comb 23 until the inclination of that comb 23 is such that leaves 47 may fall almost straight down, avoiding thereby the edge 48 of the accept chute 29. The resulting separation of debris 47 from berries 46 yields a neat produce requiring minimum preparation before delivery to the end buyer.

It would become obvious to someone knowledgeable in this art that a drum diameter larger than the diameter suggested for the exemplary embodiment, and a drum having many more combs, would increase the effective travelling speed of the apparatus, while maintaining the same selective fruit discharging feature.

It would also become obvious to someone knowledgeable in this art that a pre-travel distance "A" could be increased considerably on an embodiment where the complete separation of debris is not important. In fact, a rebounding of the fruits on a preceding comb is not absolutely required, since the falling fruits accelerate into a curvilinear path which naturally tends to distance the curvature of the cylindrical surface of drum 22. Thus, for those embodiments, the accept chute 29 would be slightly lower than the illustrated embodiment, and the rotational speed of the drum 22 would be somewhat faster than the suggested speed range of the exemplary embodiment.

Figure 7:
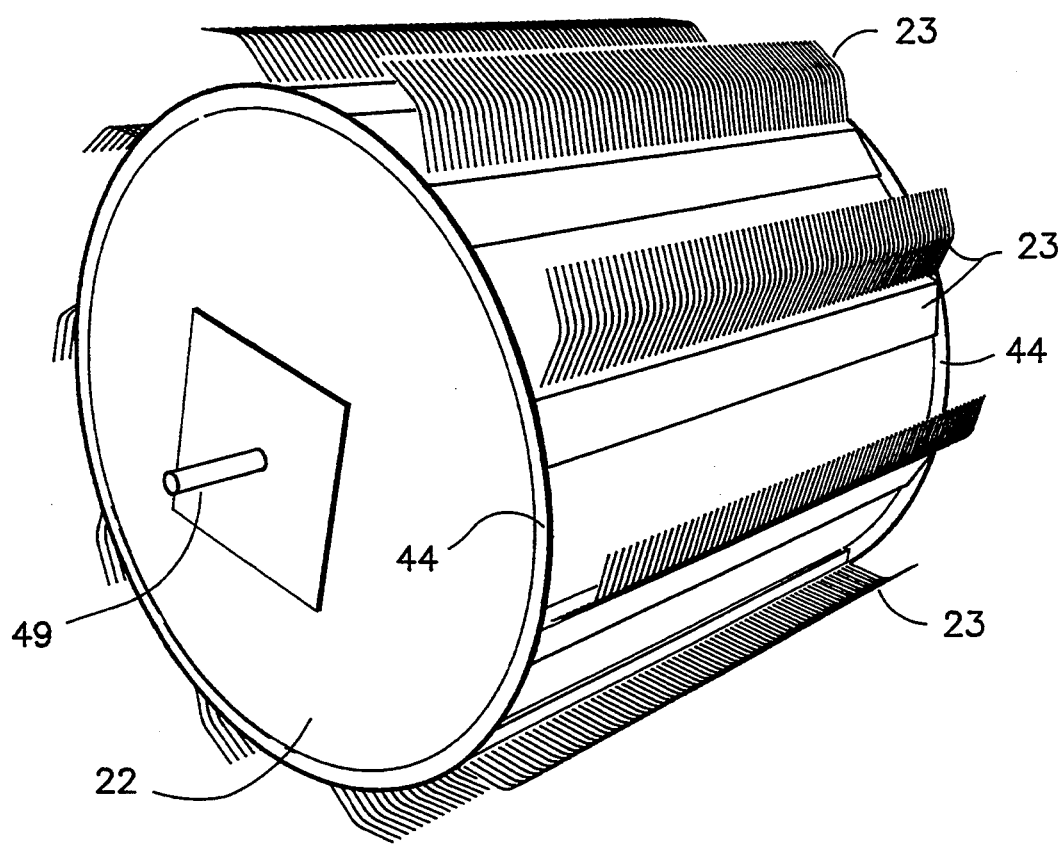
FIG. 7 is a perspective view of the harvester's drum.
Figure 8:
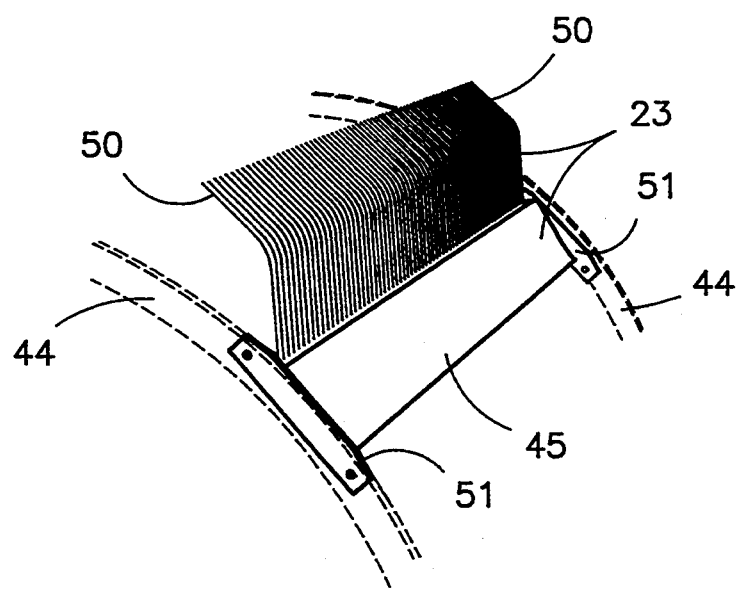
FIG. 8 shows an optional method for mounting a comb on the harvester's drum.

The harvesting drum 22 is relatively easy to fabricate as it can be seen on FIG. 7 and 8. A harvesting drum 22 would have a plurality of combs 23 spaced evenly around its circumference and across the surface thereof. The combs may be mounted on the surface of the drum by tack welding or by using fasteners through member 45 and into the cylindrical surface of the drum 22. Each edge of the drum is rimmed with a circular flange 44 in such a manner to enclose a hollow space between each comb 23 and the surface of the drum 22, to contain thereby blueberries during their ascent movement to the upper portion of the drum 22. The drum is pivoted and driven by a shaft 49 through its end plates.

Another suggested method for mounting a comb 23 on the surface of the drum 22 is illustrated on FIG. 8. The combs mounting member 45 has an end plate 51 at each end, made to be retained with fasteners, through the drum flanges 44, so that combs 23 are easily replaced if accidentally deformed.

Figure 9:
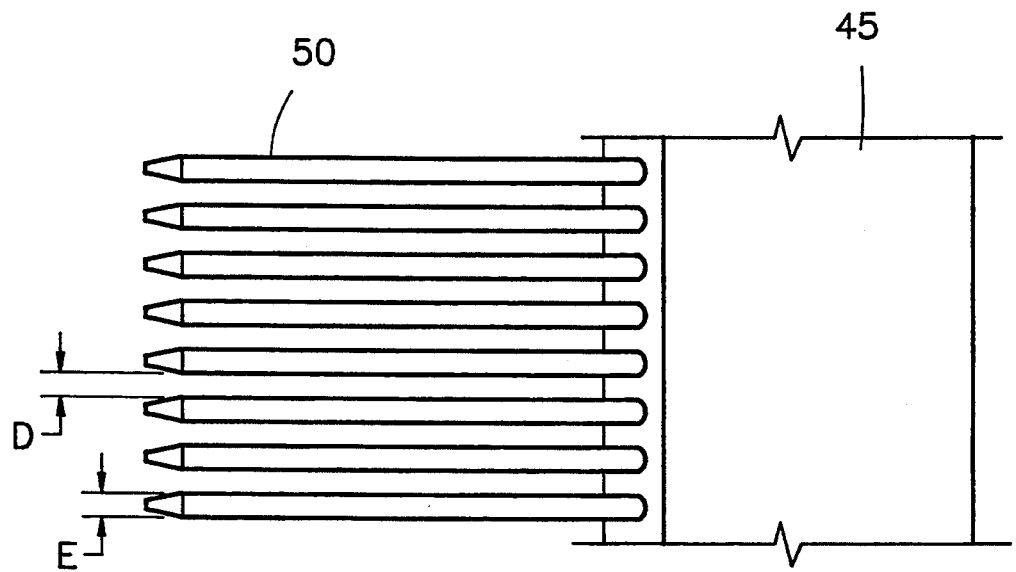
FIG. 9 is a top view of a section of a comb, to explain the spacing of fingers thereon.
Figure 10:
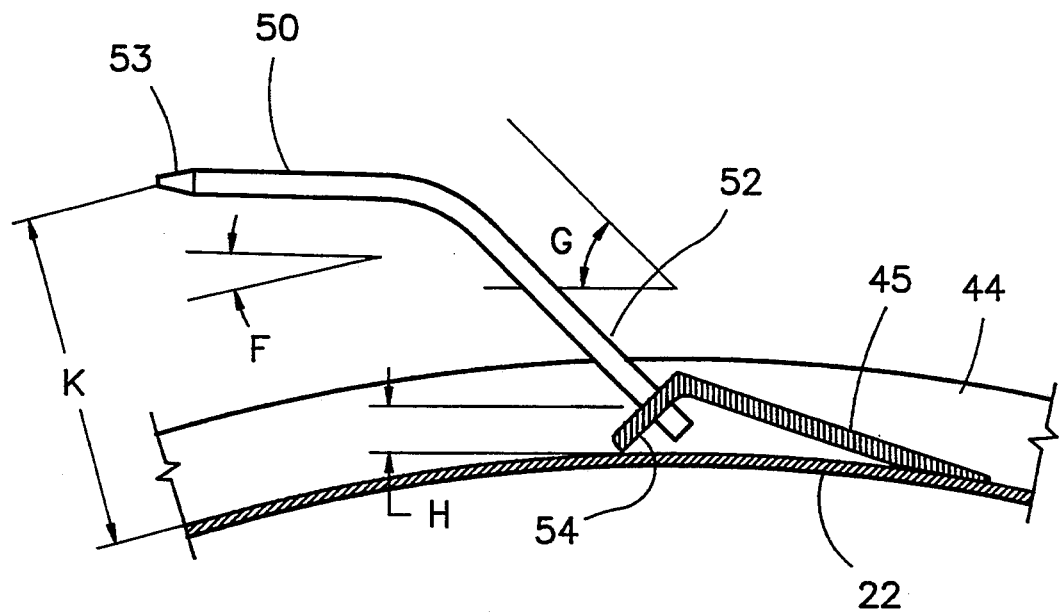
FIG. 10 illustrates a side elevation and the preferred dimensions of a finger on a comb.

Referring now to FIG. 9 and 10, the preferred dimensions for the comb 23 are illustrated thereon. These preferred dimensions apply to an exemplary embodiment of the apparatus for harvesting wild blueberries. A preferred diameter "E" for individual fingers 50, and a preferred spacing "D" between each finger 50 are substantially the same; that is, ¼ inch. It has been found that bigger fingers tend to wedge and damage the fruits, and smaller fingers are not sufficiently strong. Similarly, wider spacing reduce the efficiency of the machine, letting too many fruits escape through, and smaller spacing are subject to frequent clogging in addition to increasing the up-rooting of plants. Therefore, a spacing "D" of ¼ inch between fingers 50 having a diameter "E" of ¼ inch works well when harvesting wild blueberries. A harvesting efficiency of 80% has been observed regularly.

The harvesting efficiency and the neat-raking feature of this apparatus are also depending on the curvature and mounting of those fingers 50.

The comb's mounting member 45 has an angularly shaped cross-section having an elongated surface and a shorter surface 54. The shorter surface 54 is perforated along its length to receive the stem 52 of each finger 50. The location of the perforation is such that a spacing "H" between the base of the stems 52 and the surface of the drum 22 is maintained. A spacing "H" of ½" has given good results in preventing wedging of branches, leaves and straw, and the accumulation thereof at the base of the combs.

A smooth withdrawing of the fruit has been observed with fingers 50 having the following characteristics; finger 50 has a pointed end 53 and a stem 52 making an angle "G" of 45° with a tangent line to the surface of the drum 22 nearest to the attachment point of mounting member 45. The finger is bent at mid distance between its pointed end 53 and mounting surface 54 to further define a leading portion of finger 50 pointing in a direction of rotation. The resultant angle of entry "F" of the leading portion 50 is approximately 12°-18°. This angle "F" is measured from a tangent line to the surface of the drum 22 at a point nearest to pointed end 53. Those dimensions applied to a finger having a total length of 6½ inches, and leaving thereby a finger reach dimension "K" of 3½ inches.

With a finger reach of 3½", it has been observed that a drum advance of 3" to 4" per comb is possible. At drum rotation of 17 to 23 RPM as previously described, such advances correspond to harvesting speeds of between 42 ft/min. to 76 ft/min. depending upon the density of the blueberry bushes, and the conditions of the field.

While a preferred embodiment has been described for wild blueberries, the apparatus can be use to harvest cranberries and similar fruits growing on low plants. Similarly, other arrangements such as a machine mounted for harvesting in the tractor's forward movement would also be possible with the same drum and finger arrangement, and with the same berry separation features. Such forward moving arrangement would have lower hitch brackets 42 and cylinder 38 mounted on a subframe made to adapt to, or made to be used as a replacement of, a conventional front end loading bucket.

Therefore, the preferred embodiment of the invention as described herein, is not limited thereto, and it will be apparent to those skilled in the art that numerous modifications form part of the present invention insofar o as they do not depart from the spirit, nature and scope of the claimed and described invention.

I claim:

1. An apparatus for harvesting fruits on low plants comprising:
   a rotatable body having,
   a fruit impermeable surface,
   finger means for penetrating said plants and for withdrawing said fruits from said plants and,
   fruit disengaging means cooperating with said fruit impermeable surface, whereby upon rotation of said rotatable body, said fruits are controlled and selectively discharged at a collection point spaced exteriorly from said fruit impermeable surface, and wherein
   said finger means, cooperatively with said fruit impermeable surface and upon rotation of said rotatable body, controls and selectively discharges plant remains at a disposal point spaced between said fruit collection point and said fruit impermeable surface.

2. An apparatus for harvesting fruits on low plants as claimed in claim 1 wherein,
   a friction between said plant remains and said fruit impermeable surface, associated with a curvature of said fruit impermeable surface at a point of contact of said plant remains, retards a falling of said plant remains from said fruit impermeable surface until reaching said disposal point.

3. An apparatus for harvesting fruits on low plants as claimed in claim 1 wherein,
   said rotatable body has a horizontal rotational axis, and wherein
   said rotatable body is movable over a crop in a direction before an ascendable segment thereof.

4. An apparatus for harvesting fruits on low plans as claimed in claim 1 wherein,
   said finger means are fixed relative to said fruit impermeable surface.

5. An apparatus for harvesting fruits on low plants as claimed in claim 1, wherein
   said rotatable body is mounted within a framing means, and
   said framing means has bracket means for mounting on a 3-point hitch of a farm tractor.

6. An apparatus for harvesting fruits on low plants comprising:
   a rotatable body having,
   a fruit impermeable cylindrical surface, and
   a horizontal rotational axis,
   a framing means for supporting said rotatable body, said framing means being movable over a crop in a direction before an ascendable segment of said cylindrical surface,
   a plurality of combs each having a plurality of fingers and a means for mounting said fingers,
   each said comb being circumferentially spaced at regular intervals over said cylindrical surface, and extending axially along said rotatable body,
   each said finger having a stem extending away from said cylindrical surface, and having a leading portion pointing substantially in a direction of rotation of said rotatable body, said leading portion being defined by a pointed end,
   said fingers being spaced from each other a distance which is less than the dimension of the fruit to be harvested,
   wherein said advance of said framing means, associated with a rotation of said rotatable body causes said comb to enter a plant and to move said fingers in an ascending direction, retaining the fruits thereon,
   wherein said rotation of said rotatable body further carries said retained fruits over an uppermost position on said cylindrical surface,
   and wherein a rotational speed of said rotatable body, is synchronization with rolling, under an influence of gravity, of harvested fruits on said cylindrical surface, whereby falling fruits are disengagement from an uppermost comb, and engageable with a descending subsequent comb, rebounding on said descending comb to thereby be projected to fruit collecting means spaced from said cylindrical surface.

7. An apparatus for harvesting fruits on low plants as claimed in claim 6 wherein,
   said retention of fruits during said ascending movement of combs incidentally retains debris and wherein,
   a friction between said debris and said cylindrical surface, associated with a curvature of said cylindrical surface at a point of contact of said debris, retards the falling of said debris until entering within a space between said cylindrical surface and said fruit collecting means, avoiding thereby said fruit collecting means.

8. An apparatus for harvesting fruits on low plans as claimed in claim 6 wherein, said rotational speed of said rotatable body is also synchronizable with rolling, under an influence of gravity, of harvested fruits on said cylindrical surface, whereby said falling fruits are disengageable from an uppermost comb, and accelerated into a curvilinear path distancing a curvature of said cylindrical surface, before engaging with a descending subsequent comb, to thereby be projected to fruit collecting means spaced from said cylindrical surface.

9. An apparatus for harvesting fruits on low plants as claimed in claim 6 wherein, said framing means has bracket means for mounting on a 3-point hitch of a farm tractor, or for mounting into, or as a replacement of, a conventional front end loading bucket of a farm tractor.

10. An apparatus for harvesting fruits on low plants as claimed in claim 6 wherein, said framing means has a bumper roll to prevent said fingers from entering into sod or into a root system of said plants, wherein, said bumper roll has a length at least as long as a length of said rotatable body along an axis of rotation of said rotatable body, said bumper roll is installed axially parallel to said axis of rotation of said rotatable body, near a descending segment of said cylindrical surface, such that said bumper roll has a lowest segment vertically nearer to the ground than a passing distance of said finger from the ground.

11. An apparatus for harvesting fruits on low plants as claimed in claim 6, wherein said framing means has;

storage space for a plurality of empty receptacles, storage space for a plurality of full receptacles, such that said apparatus does not have to stop amid a harvesting pass through a field for the purpose of loading or unloading receptacles for harvested fruits.

12. An apparatus for harvesting fruits on low plants as claimed in claim 6, wherein said framing means has;

a platform for an operator to stand on, and a seat for an operator to alternatively sit on, said seat being located such that said operator has a clear line of sight of said plants in front of said apparatus, and such that said platform and said seat place said operator within arm reach of controls regulating function's of said apparatus.

13. An apparatus for harvesting fruits on low plants as claimed in claim 6 wherein, said cylindrical surface has a diameter of substantially at least 36", and wherein said plurality of combs comprises at least 10 combs.

14. An apparatus for harvesting fruits on low plants as claimed in claim 6 wherein, said finger has a diameter of substantially $\frac{1}{4}"$, and wherein said distance between each said finger is substantially $\frac{1}{4}"$.

15. An apparatus for harvesting fruits on low plants as claimed in claim 6 wherein, there is provided a shortest distance between a base of said stem on said mounting means, and a point on said cylindrical surface, of substantially $\frac{1}{2}"$.

16. An apparatus for harvesting fruits on low plants as claimed in claim 6 wherein, an angle between said stem and a tangent line to said cylindrical surface at a point of mounting of said mounting means on said cylindrical surface, is about 45°, and wherein, an angle between said leading portion and a tangent line to said cylindrical surface at a point nearest to said pointed end is between about 12° and about 18°.

17. An apparatus for harvesting fruits on low plants as claimed in claim 6 wherein, a shortest distance between said pointed end and a point on said cylindrical surface is about $3\frac{1}{2}"$.

18. A method for harvesting fruits on low plants, comprising the steps of:

effecting retention and ascending movement of said fruits, causing a withdrawing of said fruits from said plants, effecting further ascending displacement of said fruits to an uppermost point, effecting a descending movement of said fruits in a rolling mode, from said uppermost point, such that said fruits depart from a retention point, effecting acceleration of said fruits towards a downwardly inclined linear or curvilinear path, effecting a mid-fall deviation of said descending fruits towards a new course outranging a previously effected path, effecting collection of said harvested fruits at a collection point spaced from a projection of said previously effected path.

19. A method for harvesting plants on low plants as claimed in claim 18, wherein said withdrawing of said fruits incidentally retains plant remains, comprising the additional steps of:

causing a frictional difference between said fruits and said plant remains such that said remains maintain a descending course following said previously effected path, effecting steepening of said previously effected path until such steepened path is substantially vertical, effecting vertical discharging of said plant remains at a disposal point within a spacing between said fruit collection point and a projection of said steepened path.

20. A method for harvesting fruits on low plants as claimed in claim 18, wherein said mid-fall deviation of said fruits is replaced by;

effecting further acceleration of said fruits towards a slighter descent than a projection of said previously effected path.

* * * * *